(12) United States Patent
Morimitsu et al.

(10) Patent No.: US 9,187,663 B2
(45) Date of Patent: Nov. 17, 2015

(54) INK COMPOSITION AND METHOD OF JETTING INK

(71) Applicant: XEROX CORPORATION, Norwalk, CT (US)

(72) Inventors: Kentaro Morimitsu, Mississauga (CA); Jennifer L. Belelie, Oakville (CA); Naveen Chopra, Oakville (CA); Adela Goredema, Mississauga (CA); Gabriel Iftime, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 287 days.

(21) Appl. No.: 13/848,365

(22) Filed: Mar. 21, 2013

(65) Prior Publication Data
US 2014/0285594 A1    Sep. 25, 2014

(51) Int. Cl.
*B41J 2/175* (2006.01)
*C09D 11/34* (2014.01)
*B41J 2/21* (2006.01)

(52) U.S. Cl.
CPC ........... *C09D 11/34* (2013.01); *B41J 2/17593* (2013.01); *B41J 2/2107* (2013.01)

(58) Field of Classification Search
CPC .... B41J 2/17593; B41J 2/2107; C09D 11/34; C09D 11/92
USPC ............... 347/88, 95–100; 106/31.29–31.31, 106/31.61–31.63
See application file for complete search history.

(56) References Cited

U.S. PATENT DOCUMENTS

| | | | |
|---|---|---|---|
| 2,937,203 A | 5/1960 | Fuller | |
| 4,028,093 A | 6/1977 | Teach | |
| 4,889,560 A | 12/1989 | Jaeger et al. | |
| 6,132,665 A | 10/2000 | Bui et al. | |
| 8,741,043 B2 * | 6/2014 | Goredema et al. | 106/31.29 |
| 8,808,438 B2 * | 8/2014 | Morimitsu et al. | 106/31.29 |
| 2010/0288162 A1 | 11/2010 | Goredema et al. | |
| 2010/0292467 A1 | 11/2010 | Goredema et al. | |
| 2011/0061565 A1 * | 3/2011 | Banning et al. | 106/31.13 |
| 2012/0272864 A1 | 11/2012 | Morimitsu et al. | |
| 2012/0272865 A1 * | 11/2012 | Morimitsu et al. | 106/31.61 |
| 2012/0274699 A1 | 11/2012 | Belelie et al. | |
| 2012/0274700 A1 * | 11/2012 | Belelie et al. | 347/20 |
| 2012/0274713 A1 | 11/2012 | Odell et al. | |
| 2014/0368588 A1 * | 12/2014 | Keoshkerian et al. | 347/88 |

FOREIGN PATENT DOCUMENTS

| | | |
|---|---|---|
| JP | 57040408 A | 3/1982 |
| JP | 11071335 A | 3/1999 |

OTHER PUBLICATIONS

Iftime et al., "Fast Crystallizing Crystalline-amorphous Ink Compositions and Methods for Making the Same", U.S. Appl. No. 13/457,157, filed Apr. 26, 2012.

(Continued)

*Primary Examiner* — Matthew Luu
*Assistant Examiner* — Rut Patel
(74) *Attorney, Agent, or Firm* — MH2 Technology Law Group LLP

(57) ABSTRACT

A phase change ink composition is disclosed. The composition comprises a crystalline component including a diamide compound with an aromatic ring core; an amorphous component; and optionally a colorant. Methods of printing the phase change ink composition are also disclosed.

20 Claims, 3 Drawing Sheets

(56) References Cited

OTHER PUBLICATIONS

Iftime et al., "Time Resolved Optical Microscopy ("trom") Process for Measuring the Rate of Crystallization of Solid Inks", U.S. Appl. No. 13/456,847, filed Apr. 26, 2012.
Author Unknown, "Hercules® Amine D and Amine D Acetate 50S", Hercules, Technical Information, Bulletin: R-132, Nov. 18, 1997, pp. 1-6.
Author Unknown, Dehydroabietylamine, Chemical Book, retrieved from http://www.chemicalbook.com/ChemicalProductProperty_EN_CB1692875.htm, on Dec. 5, 2012, pp. 1-3.
Chopra et al., "Ink Composition and Method of Jetting Ink", U.S. Appl. No. 13/765,827, filed Feb. 13, 2013.
Author Unknown, Primene™ JM-T, 1 page, http://www.dow.com/products/product_print.page?display-mode=print&product=1120468, accessed Oct. 20, 2011.
Author Unknown, Primene™ JM-T Amine, Rohm and Haas, Organic Specialties, Oct. 2006, pp. 1-2.
Author Unknown, Primene™ 81-R, Rohm and Haas, Material Safety Data Sheet, Jul. 30, 2010, pp. 1-4, http://www.dow.com/products/product_print.page?display-mode=print&product=112054, accessed Oct. 20, 2011.
Author Unknown, Primene™ 81-R Amine, Rohm and Haas, Organic Specialties, Oct. 2006, pp. 1-2.
Author Unknown, Primene™ 81-R, 1 page, http://www.dow.com/products/product_print.page?display-mode=print&product=1120547, accessed Oct. 20, 2011.
Author Unknown, Rosin Amine, PDM, Material Safety Data Sheet, Jan. 2011, pp. 1-3.
Non-Final Office Action dated Dec. 6, 2013, for U.S. Appl. No. 13/765,827, filed Feb. 13, 2013, pp. 1-13.

\* cited by examiner

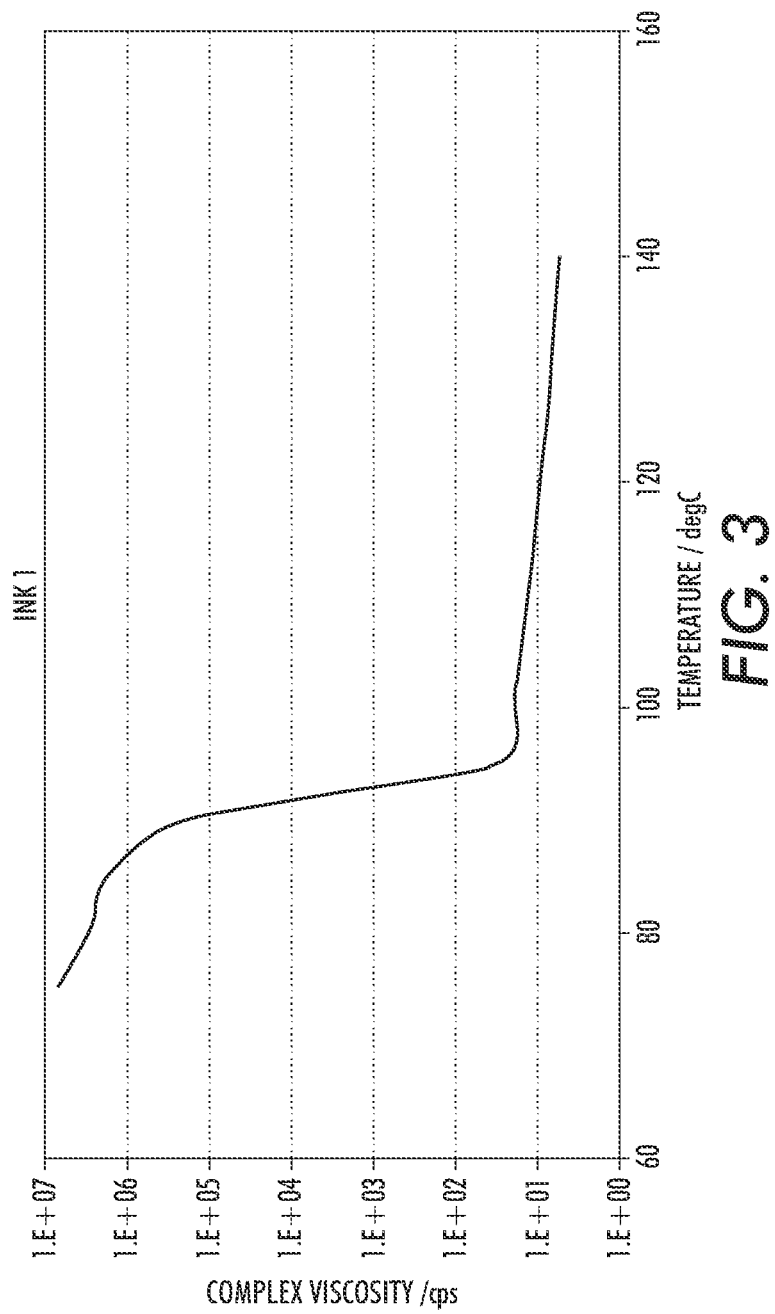

INK COMPOSITION AND METHOD OF JETTING INK

DETAILED DESCRIPTION

1. Field of the Disclosure

The present disclosure is directed to a phase change ink composition, and more particularly to a phase change ink composition comprising a crystalline diamide compound with an aromatic core.

2. Background

The present embodiments relate to diamide compounds with an aromatic core as crystalline materials for phase change ink compositions (or solid inks) characterized by being solid at room temperature and molten at an elevated temperature at which the molten ink is applied to a substrate. These phase change ink compositions can be used for ink jet printing.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates. There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

An embodiment of the present disclosure is directed to a phase change ink composition. The composition comprises a crystalline component comprising a diamide compound with an aromatic ring core; an amorphous component; and optionally a colorant.

Another embodiment of the present disclosure is directed to a method. The method comprises providing an ink jet printing device including a phase change ink composition. The phase change ink composition is in solid form and comprises (a) a crystalline component comprising a diamide compound with an aromatic ring core, (b) an amorphous component and (c) optionally a colorant. The solid phase change ink composition is heated to a temperature above the melting point of the composition to liquefy the ink composition. The liquefied ink composition is jetted from the ink jet printing device onto a substrate to form an image.

Yet another embodiment of the present disclosure is directed to a phase change ink composition. The composition comprises a crystalline component comprising a diamide compound with an aromatic ring core; an amorphous component; and optionally a colorant. The crystalline component has a viscosity of less than 10 cps at a temperature of 140° C. The amorphous component has a viscosity less than 100 cps at a temperature of about 140° C. The crystalline component has a viscosity of greater than $1\times10^6$ cps at room temperature; and the amorphous component has a viscosity of greater than $1\times10^5$ cps at room temperature.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

FIG. 3 shows rheology data of an ink discussed in the examples of the present disclosure.

Figure 1:
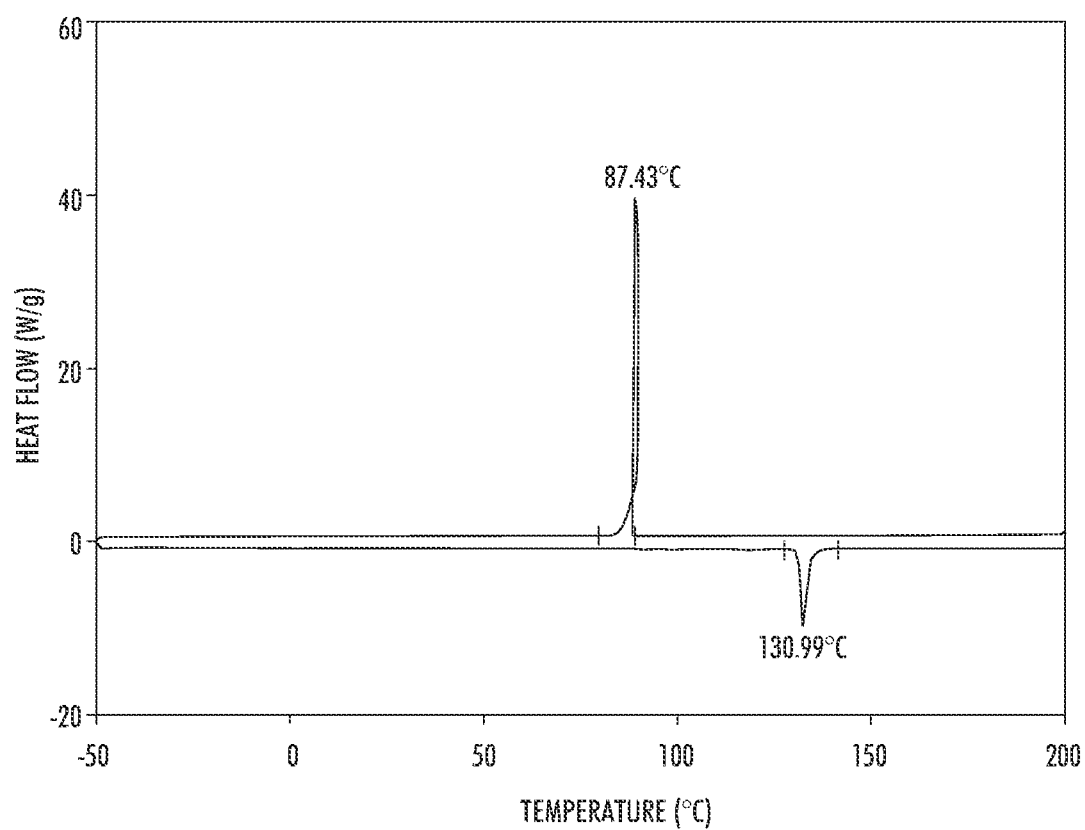
FIG. 1 shows differential scanning calorimetry (DSC) data for N,N',N'',N'''-tetraethyl terephthalamide, according to an example of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.
Phase Change Ink Compositions An embodiment of the present disclosure is directed to a phase change ink composition. The ink composition includes components comprising (a) a crystalline diamide compound with an aromatic ring core, (b) an amorphous component and (c) optionally a colorant.

a. Crystalline Diamide Compounds

Any crystalline diamide compound with an aromatic ring core that is suitable for use as the crystalline component of a phase change ink can be employed. The diamide compound can comprise any suitable aromatic ring core such as, for example, a benzene group or a naphthalene group. The ring structure can be substituted with organic amides at any suitable position that will provide the desired phase change properties for the ink, as illustrated by formula 1:

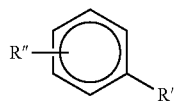

(1)

where R' and R" are selected from organic amide groups that include at least one $C_1$ to $C_{40}$ substituent group. Examples of suitable R' and R" groups include those independently selected from the amide groups of formulae 2 and 3:

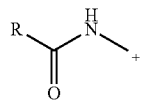

(2)

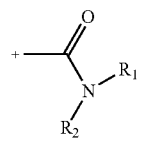

(3)

where R, $R_1$ and $R_2$ can be independently selected from the group consisting of a hydrogen atom or a linear, branched or cyclic, saturated or unsaturated, aliphatic or aromatic $C_1$ to $C_{40}$ substituent group that will result in a crystalline compound that provides the desired ink properties, such as a liquid phase state with suitable viscosity at jetting temperatures and solid phase state at about room temperature (e.g., about 25° C.), where at least one of R, $R_1$ and $R_2$ is not a hydrogen atom. In formulae 2 and 3, the single bond and "+" sign together represent the bond between the benzyl group of formula 1 and either the nitrogen atom of formula 2 or the carbonyl group of formula 3.

While $C_1$ to $C_{40}$ amide group substituents can be employed, for example as R, $R_1$ and $R_2$, substituents with carbon chains longer than 22 carbon atoms may form a wax based crystalline component. In some cases it may be desirable to employ a non-wax based crystalline component, in which case the R, $R_1$ and $R_2$ substituents disclosed herein may have chain lengths of 22 carbon atoms or less. For example, the R, $R_1$ and $R_2$ substituents herein can be chosen from linear, branched or cyclic, saturated or unsaturated, aliphatic or aromatic $C_2$ to $C_{18}$ groups optionally including one or more heteroatoms, such as oxygen, nitrogen or a halogen atom, such as chlorine or bromine.

In an embodiment, the crystalline component comprises a compound of formula 4:

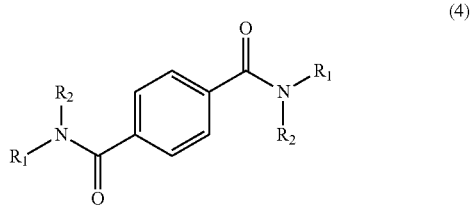

(4)

where $R_1$ and $R_2$ are independently selected from the group consisting of hydrogen atoms, alkyl groups, alkenyl groups, aryl groups, arylalkyl groups, alkylaryl groups and alkyl, alkenyl, aryl, arylalkyl and alkylaryl groups containing one or more hetero atoms, where at least one of $R_1$ and $R_2$ is not a hydrogen atom.

Specific examples for $R_1$ and $R_2$ substituents for the compound of Formula 4 include hydrogen, ethyl, n-propyl, i-butyl, substituted or unsubstituted $C_{10}$ to $C_{25}$ alkyl groups, where the optional substituent can be an O, N or S containing functional group, such as unsubstituted $C_{12}$-$C_{18}$ alkyls, $C_{10}$ to $C_{25}$ alkyl amines, $C_{10}$ to $C_{25}$ alkoxyalkyls or $C_{10}$ to $C_{25}$ alcohols. Examples of suitable precursors for forming the —$NR_1R_2$ groups of formula 4, where $R_1$ and $R_2$ are alkyl groups, include tertiary-alkyl primary amines, such as those described in U.S. Pat. No. 2,937,203, the disclosure of which is hereby incorporated by reference in its entirety. Examples of commercially available tertiary-alkyl primary amines include PRIMENE™ 81-R and PRIMENE JM-T, both of which are available from Rohm and Haas Company, located in Philadelphia, Pa.

In an embodiment, the crystalline material comprises a compound of formula 5:

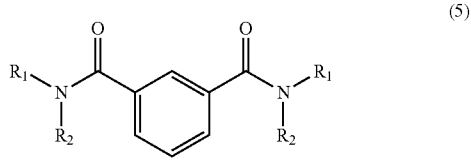

(5)

where $R_1$ and $R_2$ are independently selected from the group consisting of hydrogen atoms, alkyl groups, alkenyl groups, aryl groups, arylalkyl groups, alkylaryl groups and alkyl, alkenyl, aryl, arylalkyl and alkylaryl groups containing one or more hetero atoms, where at least one of $R_1$ and $R_2$ is not a hydrogen atom. Specific examples for $R_1$ and $R_2$ for the compounds of formula 5 include n-propyl, i-propyl, n-butyl, allyl, substituted or unsubstituted $C_{10}$ to $C_{25}$ alkyl groups, where the optional substitutent can be an O, N or S containing functional group, such as unsubstituted $C_{12}$-$C_{18}$ alkyls, $C_{10}$ to $C_{25}$ alkyl amines, $C_{10}$ to $C_{25}$ alkoxyalkyls or $C_{10}$ to $C_{25}$ alcohols.

In another embodiment, the crystalline material comprises a diamide compound of formula 6:

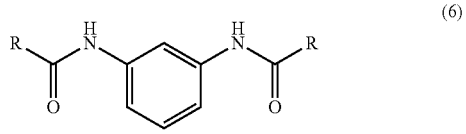

(6)

where R is selected from the group consisting of alkyl groups, alkenyl groups, aryl groups, arylalkyl groups, alkylaryl groups, and alkyl, alkenyl, aryl, arylalkyl and alkylaryl groups containing one or more hetero atoms. Specific examples for R include $C_5$-$C_7$ alkyl groups.

The crystalline component in the ink formulation drives the phase change through rapid crystallization as the ink cools. The crystalline component also sets up the structure of the final ink film and creates a hard ink by reducing the tackiness of the amorphous component. The crystalline components exhibit relatively low viscosity, such as, for example, $\leq 10^1$ centipoise (cps), or from about 0.5 to about 20 cps, or from about 1 to about 15 cps, at about 140° C.; and relatively high viscosity, such as, for example $>10^6$ cps, at room temperature. Because the crystalline components generally dictate the phase change of the ink, rapid crystallization can provide immediate print processing (e.g., spreading or duplex printing) and reduce or prevent excessive show through on uncoated substrates.

Desirable crystalline components can show relatively sharp crystallization and melting peaks, as determined by, for example, differential scanning calorimetry (DSC) (e.g., heating at 10° C./min from −50° C. to 200° C. and then cooling back down to −50° C.). In an embodiment, the change in temperature between the crystallization and melting peaks is relatively small, such as, for example, less than about 55 or about 60° C. In an embodiment, the melting point ($T_{melt}$) can be below the upper limit of the jetting temperature. For example, the melting point can be below about 150° C., such as from about 65° C. to about 150° C., or such as from about 66° C. to about 145° C. A suitable melting point can reduce or prevent blocking and print transfer and may vary depending on standing temperatures that occur in the printing apparatus. For example, the melting point can be above 65° C., such as above 66° C. or 67° C., to reduce or prevent blocking and print transfer upon standing at temperatures up to 65° C. The crystallizing temperature ($T_{crys}$) can be greater than about 60° C., or from about 60° C. to about 140° C., or from about 65° C. to about 120° C.

b. Amorphous Component

Any amorphous component that is suitable for phase change ink compositions can be employed. The amorphous component of the ink composition can provide tackiness and/or impart robustness to the printed ink. Examples of suitable amorphous components include di-L-menthyl L-tartrate, di-DL-menthyl L-tartrate, di-L-menthyl DL-tartrate, di-DL-menthyl DL-tartrate, and any stereoisomers and mixtures thereof. In an embodiment, the amorphous material is di-DL-menthyl L-tartrate.

The amorphous components can be synthesized by, for example, an esterification reaction of tartaric acid, as is well known in the art. These materials show relatively low viscosity (e.g., $<10^2$ centipoise (cps), or from about 1 to about 100 cps, or from about 5 to about 95 cps) near the jetting temperature (e.g., $\leq 140°$ C., or from about 100 to about 140° C., or from about 105 to about 140° C.) but relatively high viscosity (e.g., $>10^5$ cps) at room temperature. Using tartaric acid as an ester base has the additional advantages of being low cost and the possibility of being obtained from a bio-derived ("green") source.

c. Colorants

In an embodiment, the colorant employed in the inks of the present disclosure is chosen from a dye, a pigment or mixtures thereof. Any dye or pigment may be chosen, provided that it is capable of being dispersed or dissolved in the ink carrier and is compatible with the other ink components.

The phase change carrier compositions of the present disclosure can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 38W (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN(Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR(C.I. Solvent Black 35) (ICI); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby entirely incorporated by reference herein, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

In an embodiment, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

Pigments are also suitable colorants for the phase change inks of the present disclosure. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Pigment dispersions in the ink base may be stabilized by synergists and dispersants. Any suitable synergists and/or dispersants can be employed. Suitable synergists and dispersants are well known in the art. An example of a suitable dispersant includes polyethyleneimine. Examples of suitable synergists are SOLSPERSE®, from LUBRIZOL and Sunflo SFD-B124.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The phase change ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich), 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich), α-trifluoro-o-cresol (Aldrich); 2-bromo-4-fluorophenol (Aldrich); 4-fluorophenol (Aldrich); 4-chlorophenyl-2-chloro-1,1,2-tri-fluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich), 3-(2H-benzotriazol-2-yl)-4-hydroxy phenethylalcohol (Aldrich); NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Any other ingredients suitable for use in phase change inks can also optionally be included in the compositions of the present disclosure. One of ordinary skill in the art would readily be able to determine other ingredients that can be employed.

Methods of Making the Compositions

The ink compositions can be prepared by any desired or suitable method. For example, each of the components of the ink carrier can be mixed together, followed by heating the mixture to at least its melting point, for example from about 60° C. to about 150° C., about 80° C. to about 145° C., or about 85° C. to about 140° C. The colorant may be added before or after the crystalline and amorphous ink ingredients have been heated.

The crystalline and amorphous components can be blended in a weight ratio so as to provide the desired ink properties. Examples of suitable weight ratios of crystalline to amorphous materials are about 60:40 to about 95:5, respectively, such as about 65:35 to about 95:5, or from about 70:30 to about 90:10. In an embodiment, the weight ratio is about 70:30 for the crystalline and amorphous components, respectively. In another embodiment, the weight ratio is about 80:20 for the crystalline and amorphous components, respectively.

The colorant may be present in the phase change ink in any desired or effective amount to obtain the desired color or hue such as, for example, from about 0.1 percent by weight of the ink to about 50 percent by weight of the ink, or from about 0.2 percent by weight of the ink to about 20 percent by weight of the ink, or from about 0.5 percent by weight of the ink to about 10 percent by weight of the ink.

When pigments are the selected colorants, the molten mixture may be subjected to grinding in an attritor or media mill apparatus to effect dispersion of the pigment in the ink carrier. The heated mixture can then be stirred for about 5 seconds to about 30 minutes or more, for example, to obtain a substantially homogeneous, uniform melt, followed by cooling the ink to ambient temperature (typically from about 20° C. to about 25° C.).

The resulting inks are solid at ambient temperature. The inks can be employed in an apparatus for direct printing ink jet processes or in indirect (offset) printing ink jet applications.

In embodiments, the ink carriers for the phase change inks may have a viscosity of from about 1 to about 22 cps, or from about 4 to about 15 cps, or from about 6 to about 12 cps, at a the jetting temperature. The jetting temperature can range, for example, from about 100° C. to about 140° C. In embodiments, the solid ink has a viscosity of about >10$^6$ cps, at room temperature. In embodiments, the solid ink has a melting temperature ($T_{melt}$) of from about 65 to about 150° C., or from about 70 to about 140° C., from about 80 to about 135° C. and a crystallizing temperature ($T_{crys}$) of from about 40 to about 140° C., or from about 45 to about 130° C., from about 50 to about 120° C., as determined by DSC at a rate of 10° C./min.

Methods of Printing

The present disclosure is also directed to a printing method. The method comprises providing an ink jet printing device comprising a phase change ink composition. As described herein above, the phase change ink composition is in solid form and comprises: (a) a crystalline aromatic diamide, (b) an amorphous material and (c) optionally a colorant. The solid ink composition is heated in the ink jet printing device to a temperature above the melting point of the composition to liquefy the ink. The liquefied ink can then be jetted from the ink jet printing device onto a substrate to form an image. Examples of suitable direct printing processes are disclosed in, for example, U.S. Pat. No. 5,195,430, the disclosure of which is totally incorporated herein by reference.

In an embodiment, the melted ink can first be jetted onto an intermediate transfer member. The ink can then be transferred from the intermediate transfer member to a final recording substrate. Examples of suitable offset or indirect printing processes are disclosed in, for example, U.S. Pat. No. 5,389,958, the disclosure of which is totally incorporated herein by reference.

In an embodiment, the printing apparatus employs a piezoelectric printing process wherein droplets of the ink are caused to be ejected in an imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed in the printing processes of the present disclosure. Example substrates include plain papers such as XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX® Digital Color Elite Gloss, Sappi Warren Papers LUSTROGLOSS, specialty papers such as Xerox® DURAPAPER, and the like, transparency materials, fabrics, textile products, plastics, polymeric films, inorganic recording mediums such as metals and wood, and the like.

The phrase "printing device" as used herein encompasses any apparatus, such as a digital copier, bookmaking machine, facsimile machine, multi-function machine, and the like, which performs a print outputting function for any purpose.

EXAMPLES

Diamides of terephthalic acid, isophthalic acid and m-phenylenediamine, which are used in the examples below, were chosen based on melting temperature ($T_{melt}$), as shown in Tables 1, 2, and 3. Promising compounds were synthesized to examine thermal properties. Representative procedures for synthesizing compounds are described below.

For good candidates, differential scanning calorimetry (DSC) was employed to measure crystallization temperature ($T_{crys}$) of the materials. As an example, DSC data for N,N',N'',N'''-tetraethyl terephthalamide (T3 in the Tables below) is shown in FIG. 1. The DSC data was obtained on a Q1000 Differential Scanning Calorimeter (TA Instruments) at a rate of 10° C./min from −50 to 200 to −50° C. Some materials showed very sharp transitions within the desirable temperature range indicating promising properties for the phase changing material of the ink.

Figure 2:
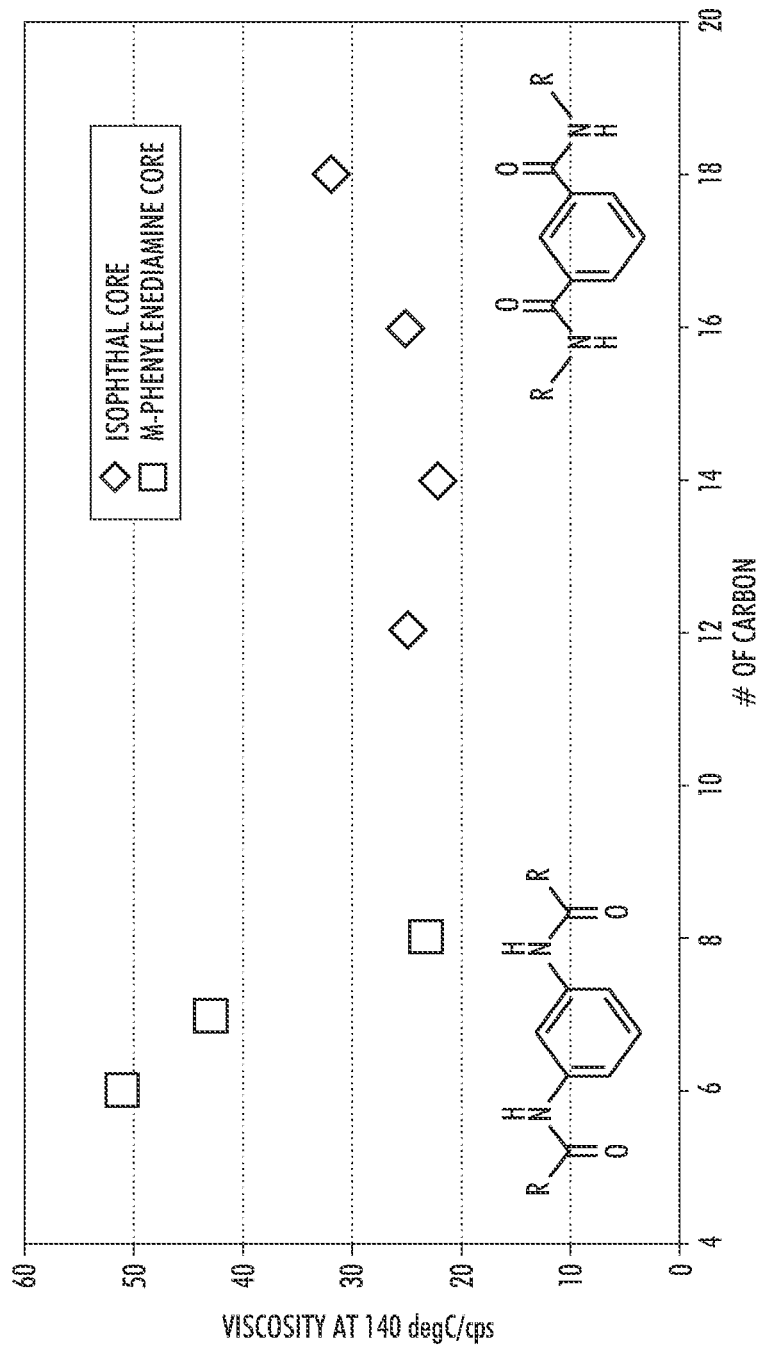
FIG. 2 shows viscosity data at 140° C. of dialkylamides of isophthalic acid and m-phenylenediamine, according to an example of the present disclosure.

Among the derivatives, compounds T3, T6, T11, T23, I6, I8, I9, I14, I15, I16, I17, I18, I20, M7, M8, and M9 showed desirable $T_{melt}$. See Tables 1, 2 and 3 below. These compounds were synthesized (except I14); however, most compounds did not meet other ink requirements (e.g., $T_{crys}$ were too low or melt viscosities were too high). $T_{crys}$ of T6, T11, and I8 were below 65° C., which indicated slow crystallization. Viscosities at 140° C. of I15, I16, I17, I18, I20, M7, M8, and M9 were over 20 cps (See FIG. 2). As a crystalline component, melt viscosity of below 10 cps is desirable for jettability.

Compounds T3 (N,N',N'',N'''-tetraethyl terephthalamide) and I9 (N,N'-di-n-butyl isophthalamide) were selected for ink formulation as the most promising materials based on the above described procedures.

TABLE 1

Melting points of diamides having terephthalic acid core.

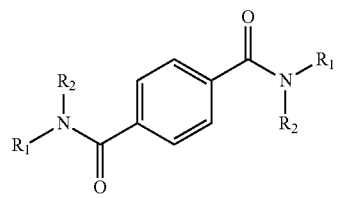

| # | —R$_1$ | —R$_2$ | $T_{melt}$ (° C.)* |
|---|--------|--------|---------------------|
| T1 | Me | H | 310-312 |
| T2 | Et | H | 260-261 |
| T3 | Et | Et | 128-130 |
| T4 | n-Pr | H | 239-240 |
| T5 | i-Pr | H | 283-284 |

TABLE 1-continued

Melting points of diamides having terephthalic acid core.

| # | —R₁ | —R₂ | $T_{melt}$ (° C.)* |
|---|---|---|---|
| T6 | n-Pr | n-Pr | 100-102 |
| T7 | i-Pr | i-Pr | 207-272 |
| T8 | n-Bu | H | 223-224 |
| T9 | i-Bu | H | 240-241 |
| T10 | n-Bu | n-Bu | 77-79 |
| T11 | i-Bu | i-Bu | 126-128 |
| T12 | n-amyl | H | 215-216 |
| T13 | isoamyl | H | 211-212 |
| T14 | isoamyl | isoamyl | 69-71 |
| T15 | isohexyl | H | 184-185 |
| T16 | allyl | H | 210-213 |
| T17 | —C₁₂H₂₅ | H | 187 |
| T18 | —C₁₄H₂₉ | H | 179 |
| T19 | —C₁₆H₃₃ | H | 164 |
| T20 | —C₁₈H₃₇ | H | 171 |
| T21 | Primene 81-R | H | 160-165 |
| T22 | Primene JM-T | H | 60-70 |
| T23 | Primene 81-R/ Primene JM-T | H | 90-95 |
| T24 | 2-ethylhexyl | H | 162** |
| T25 | t-octyl | H | >200** |
| T26 | cyclohexyl | H | 273-275 |
| T27 | cyclohexyl | cyclohexyl | >200** |
| T28 | Ph | H | 338-340 |
| T29 | Ph | Ph | 340-341 |
| T30 | benzyl | benzyl | 173-174 |
| T31 | α-methylbenzyl | H | 275-278 |
| T32 | 2-methyl-phenyl | H | 297-298 |
| T33 | 3-methyl-phenyl | H | 275-276 |
| T34 | 4-methyl-phenyl | H | 343-345 |
| T35 | 2-methoxy-phenyl | H | 245-246 |
| T36 | 3-methoxy-phenyl | H | 248-250 |
| T37 | 4-methoxy-phenyl | H | 351-352 |
| T38 | 2-ethoxy-phenyl | H | 192-193 |
| T39 | 3-ethoxy-phenyl | H | 279-280 |
| T40 | 4-ethoxy-phenyl | H | 350-351 |
| T41 | 1-naphthyl | H | 367-368 |
| T42 | 2-naphthyl | H | 344-345 |
| T43 | 2-chloro-phenyl | H | 266-268 |
| T44 | 4-chloro-phenyl | H | 352-353 |
| T45 | 4-nitro-phenyl | H | 353-355 |
| T46 | Ph | Me | 212-213 |
| T47 | Ph | n-Bu | 175-176 |
| T48 | piperidino | | 208-209 |
| T49 | morpholino | | 212-215 |

*$T_{melt}$ = melting temperature (melting point data from literature).
**Experimental data. Determined by DSC at a rate of 10° C./min.

TABLE 2

Melting points of diamides having isophthalic acid core.

| # | —R₁ | —R₂ | $T_{melt}$ (° C.)* |
|---|---|---|---|
| I1 | H | H | 292-293 |
| I2 | Me | H | 198-199 |

TABLE 2-continued

Melting points of diamides having isophthalic acid core.

| # | —R₁ | —R₂ | $T_{melt}$ (° C.)* |
|---|---|---|---|
| I3 | Me | Me | 136-137 |
| I4 | Et | H | 148-149 |
| I5 | Et | Et | 85-86 |
| I6 | n-Pr | H | 131-132 |
| I7 | i-Pr | H | 210-211 |
| I8 | i-Pr | i-Pr | 132-133 |
| I9 | n-Bu | H | 131-132.5 |
| I10 | i-Bu | i-Bu | 104-105 |
| I11 | t-Bu | H | 234-236 |
| I12 | 2-ethylhexyl | H | 61** |
| I13 | t-octyl | H | 132-147** |
| I14 | allyl | H | 119-120 |
| I15 | —C₁₂H₂₅ | H | 129 |
| I16 | —C₁₄H₂₉ | H | 128 |
| I17 | —C₁₆H₃₃ | H | 129 |
| I18 | —C₁₈H₃₇ | H | 128 |
| I19 | cyclohexyl | H | 311-314 |
| I20 | Primene 81-R | H | 110-115 |
| I21 | cyclohexyl | cyclohexyl | 155-157 |
| I22 | Ph | H | 291-293 |
| I23 | 4-methyl-phenyl | H | 277-278 |
| I24 | 2-pyridyl | H | 190-192 |
| I25 | 3-pyridyl | H | 249-251 |
| I26 | 4-pyridyl | H | 321-326 |
| I27 | pyrrolidino | | (oil) |
| I28 | morpholino | | (oil) |

*$T_{melt}$ = melting temperature (melting point data from literature).
**Experimental data. Determined by DSC at a rate of 10° C./min.

TABLE 3

Melting points of diamides having m-phenylenediamine core

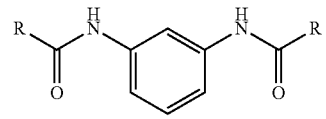

| # | —R | $T_{melt}$ (° C.)* |
|---|---|---|
| M1 | H | 152-154 |
| M2 | Me | 186-188 |
| M3 | Et | 174-175 |
| M4 | n-C₃H₇ | 142.5-143 |
| M5 | i-C₃H₇ | 205-206 |
| M6 | i-C₄H₉ | 226-230 |
| M7 | n-C₅H₁₁ | 122-125 |
| M8 | n-C₆H₁₃ | 109-113 |
| M9 | n-C₇H₁₅ | 132** |
| M10 | cyclohexyl | 210-212.5 |
| M11 | benzyl | 194-197 |
| M12 | —C₁₁H₂₃ | 136 |
| M13 | —C₁₃H₂₇ | 136 |
| M14 | —C₁₅H₃₁ | 133 |
| M15 | —C₁₇H₃₅ | 130 |

*$T_{melt}$ = melting temperature (melting point data from literature).
**Experimental data. Determined by DSC at a rate of 10° C./min.

Example 1

Synthesis of N,N',N'',N'''-tetraethyl terephthalamide (T3)

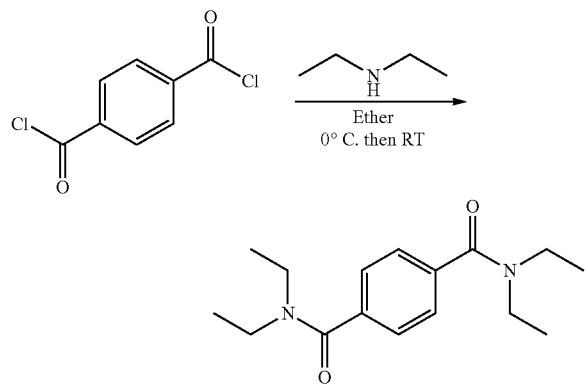

In a 1 L flask, diethylamine (40.8 ml, 394 mmol) and 200 mL of ether was added to give a colorless solution. The flask was cooled with ice bath and terephthaloyl dichloride (20.00 g, 99 mmol) in 170 mL of ether was slowly added over 40 min with stirring. The ice bath was removed and stirred at room temperature (RT) for 1 hour. The reaction mixture was poured into 500 mL of water and stirred on ice bath and filtered. Precipitated crystals were collected by filtration. Obtained crystals were recrystallized from 170 mL of MeOH/H$_2$O (1/9) (20.97 g, yield: 77%). The sample was characterized by $^1$H NMR spectroscopy.

Example 2

Synthesis of N,N'-di-n-butyl isophthalamide (I9)

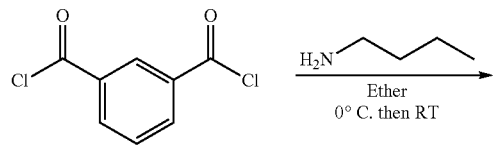

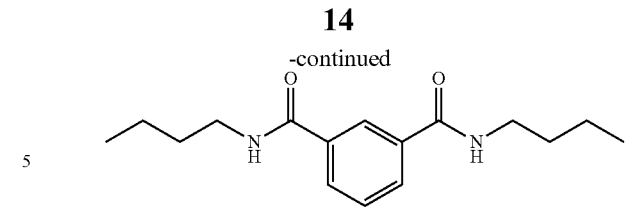

In a 500 mL flask, n-butylamine (38.9 ml, 394 mmol) and 100 mL of ether was added to give a colorless solution. The flask was cooled with an ice bath. Isophthaloyl dichloride (20.00 g, 99 mmol) in 150 mL of ether was slowly added over 30 min with stirring. The ice bath was removed and the mixture was stirred at room temperature for 1 hour. The reaction mixture was poured into 500 mL of water and stirred and filtered. Precipitated crystals were collected by filtration. Obtained crystals were recrystallized from 450 mL of MeOH/H$_2$O (5/5) (24.47 g, yield: 90%). The sample was characterized by H NMR spectroscopy.

Examples 3, 4 and 5

Preparation of Ink and Properties

Ink samples were formulated from T3 or I9, an amorphous material (Di-DL-menthyl L-tartrate (DMT), and a dye or a pigment concentrate. The formulations are shown in Table 4 and the ink samples were labeled as Ink 1 (Example 3), Ink 2 (Example 4), and Ink 3 (Example 5). The pigment concentrates contained amorphous DMT, cyan pigment B4G, dispersant (Solsperse 32000), and a synergist (SunFlo SFD-B124). The pigment concentration in the pigment concentrates was 10 wt. %. That ratio provided resulting ink with 2 wt. % pigment loading.

FIG. 3 shows rheology data for the ink of Example 3. All of the rheology measurements reported in the present disclosure were made on a RFS3 Rheometer (TA instruments), using a 25 mm parallel plate, at a frequency of 1 Hz; the method used was a temperature sweep from high to low temperatures, in temperature decrements of 5° C., a soak (equilibration) time of 120 seconds between each temperature and at a constant frequency of 1 Hz. The ink showed phase transition to >10$^6$ cps at about 95° C. The phase transition temperature will be adjustable by selection of materials and changing the crystalline/amorphous ratio within the desirable temperature range (60° C.<T<130° C.). Furthermore, the viscosity at around 140° C. was about 5 cps and again adjustable by changing the ratio or adding viscosity modifier.

TABLE 4

Ink formulations of Examples 3-5.

| Component | Example 3 Ink 1 Relative Parts (wt %) | Weight (g) | Example 4 Ink 2 Relative Parts (wt %) | Weight (g) | Example 5 Ink 3 Relative Parts (wt %) | Weight (g) |
| --- | --- | --- | --- | --- | --- | --- |
| N,N',N'',N'''-tetraethyl terephthalamide (T3) | 78.4 | 3.14 | 76.48 | 7.65 | | |
| N,N'-di-n-butyl isophthalamide (I9) | | | | | 78.4 | 3.14 |

TABLE 4-continued

Ink formulations of Examples 3-5.

| | Example 3 Ink 1 | | Example 4 Ink 2 | | Example 5 Ink 3 | |
|---|---|---|---|---|---|---|
| Component | Relative Parts (wt %) | Weight (g) | Relative Parts (wt %) | Weight (g) | Relative Parts (wt %) | Weight (g) |
| 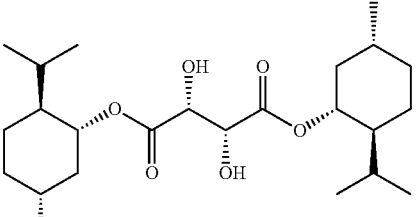 DMT (amorphous) | 19.6 | 0.78 | 3.52 | 0.35 | 19.6 | 0.78 |
| Solvent Blue 101 | 2.0 | 0.08 | | | 2.0 | 0.08 |
| Cyan pigment concentrate (B4G), 10 wt % in DMT | | | 20.00 | 2.00 | | |
| Total | 100 | 4 | 100 | 10 | 100 | 4 |

Rate of Crystallization Determined by Time-Resolved Optical Microscopy

Rate of crystallization is a characteristic of production inks. It can dictate the rate at which the ink can be touched after printing which affects the printing speed and showthrough for regular paper. Faster rates of crystallization allow for faster printing speeds. The rate of crystallization was measured using Time-Resolved Optical Microscopy ("TROM"). The TROM process is described in detail in U.S. patent application Ser. No. 13/456,847, filed Apr. 26, 2011 in the name of Gabriel Iftime et al., and entitled Time Resolved Optical Microscopy ("TROM) Process for Measuring the Rate of Crystallization of Solid Inks, the disclosure of which is incorporated herein by reference in its entirety. The resulting rate of crystallization data is shown in Table 5.

The dyed ink of Example 3 (Ink 1) showed slow crystallization rate of about 19 seconds in total. For Example 4 (Ink 2), in which pigment was used in place of dye, the rate of crystallization was about 11 seconds. The increased rate of crystallization with pigment is attributed to the pigment acting as a nucleating agent. Crystallization in about 11 seconds is an acceptable rate for high speed direct-to-paper printing systems.

Robustness Demonstration

Ink 1, 2, and 3 were printed onto Xerox® Digital Color Elite Gloss, 120 gsm (DCEG) coated papers using the K-proofer gravure printing plate, which is rigged with a pressure roll set at low pressure. The gravure plate temperature was set at 142° C., but the actual plate temperature is about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. The inks gave robust images that could not be easily removed from the substrates. When a metal, curved tip at an angle of about 15° from vertical, with a weight of 528 g applied, was drawn across the image at a rate of approximately 13 mm/s, no ink was visibly removed from the image. The tip is similar to a lathe round nose cutting bit with radius of curvature of approximately 12 mm.

TABLE 5

Rate of crystallization data of ink samples.*

| Ink ID | Rate of crystallization (TROM)/seconds |
|---|---|
| Ink 1 (dyed) | 19 |
| Ink 2 (pigmented) | 11 |
| Ink 3 (dyed) | ND* |

*Not determined, but apparently very slow in the order of minutes.

The above data indicate that the aromatic diamides of the present disclosure have suitable physical properties for the phase changing component of phase change ink. The examples demonstrated improved robustness on coated media.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A phase change ink composition, comprising:
a crystalline component comprising a diamide compound with an aromatic ring core;
an amorphous component selected from the group consisting of di-DL-menthyl L-tartrate, di-L-menthyl L-tartrate, di-L-menthyl DL-tartrate, di-DL-menthyl DL-tartrate, or stereoisomers or mixtures thereof; and
optionally a colorant.

2. The composition of claim 1, wherein the diamide compound is a compound of formula 1:

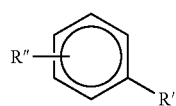

where R' and R" are independently selected from organic amide groups of formulae 2 or 3:

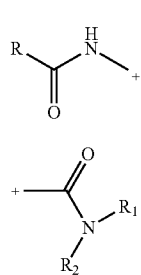

where R, $R_1$ and $R_2$ are independently selected from the group consisting of a hydrogen atom or a linear, branched or cyclic, saturated or unsaturated, aliphatic or aromatic $C_1$ to $C_{40}$ substituent group, wherein at least one of R, $R_1$ and $R_2$ is not a hydrogen atom.

3. The composition of claim 1, wherein the diamide compound is a compound of formula 4:

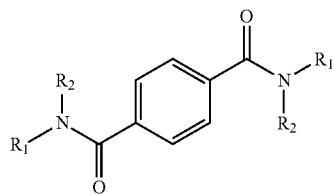

where $R_1$ and $R_2$ are independently selected from the group consisting of a hydrogen atom, alkyl group, alkenyl group, aryl group, arylalkyl group or alkylaryl group, the alkyl, alkenyl, aryl, arylalkyl and alkylaryl groups optionally containing one or more hetero atoms, wherein at least one of $R_1$ and $R_2$ is not a hydrogen atom.

4. The composition of claim 3, wherein $R_1$ and $R_2$ are independently selected from the group consisting of a hydrogen atom, ethyl, n-propyl, i-butyl or substituted or unsubstituted $C_{10}$ to $C_{25}$ alkyl groups, where the optional substitutent can be an O, N or S containing functional group.

5. The composition of claim 1, wherein the diamide compound is a compound of formula 5:

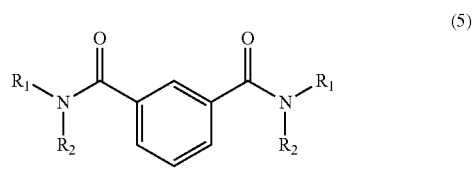

where $R_1$ and $R_2$ are independently selected from the group consisting of a hydrogen atom, alkyl group, alkenyl group, aryl group, arylalkyl group or alkylaryl group, the alkyl, alkenyl, aryl, arylalkyl and alkylaryl groups optionally containing one or more hetero atoms, wherein at least one of $R_1$ and $R_2$ is not a hydrogen atom.

6. The composition of claim 5, wherein $R_1$ and $R_2$ are independently selected from the group consisting of a hydrogen atom, n-propyl, i-propyl, n-butyl, allyl, or substituted or unsubstituted $C_{10}$ to $C_{25}$ alkyl groups, where the optional substitutent can be an O, N or S containing functional group.

7. The composition of claim 1, wherein the diamide compound is a compound of formula 6:

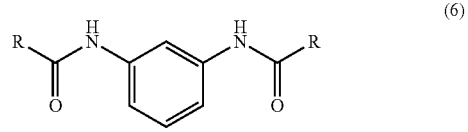

where R is selected from the group consisting of an alkyl group, alkenyl group, aryl group, arylalkyl group or alkylaryl group, the alkyl, alkenyl, aryl, arylalkyl and alkylaryl groups optionally containing one or more hetero atoms.

8. The composition of claim 7, wherein R is a $C_5$-$C_7$ alkyl group.

9. The composition of claim 1, wherein the colorant is selected from the group consisting of a dye, a pigment or mixtures thereof.

10. The composition of claim 1, wherein the crystalline and amorphous components are blended in a crystalline to amorphous component weight ratio ranging from about 60:40 to about 95:5.

11. A method comprising:
providing an ink jet printing device including a phase change ink composition, the phase change ink composition being in solid form and comprising (a) a crystalline component comprising a diamide compound with an aromatic ring core, (b) an amorphous component selected from the group consisting of di-DL-menthyl L-tartrate, di-L-menthyl L-tartrate, di-L-menthyl DL-tartrate, di-DL-menthyl DL-tartrate, or stereoisomers or mixtures thereof and (c) optionally a colorant;
heating the solid phase change ink composition to a temperature above the melting point of the composition to liquefy the ink composition; and jetting the liquefied ink composition from the ink jet printing device onto a substrate to form an image.

12. The method of claim 11, wherein each organic amide group of the diamide includes at least one aliphatic or aromatic substituent.

13. The method of claim 11, wherein the crystalline component comprises a compound of formula 4:

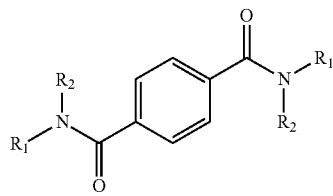

(4)

where $R_1$ and $R_2$ are independently selected from the group consisting of a hydrogen atom, alkyl group, alkenyl group, aryl group, arylalkyl group or alkylaryl group, the alkyl, alkenyl, aryl, arylalkyl and alkylaryl groups optionally containing one or more hetero atoms, wherein at least one of $R_1$ and $R_2$ is not a hydrogen atom.

14. The method of claim 11, wherein the crystalline component comprises a compound of formula 5:

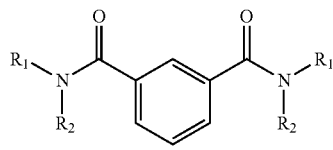

(5)

where $R_1$ and $R_2$ are independently selected from the group consisting of a hydrogen atom, alkyl group, alkenyl group, aryl group, arylalkyl group or alkylaryl group, the alkyl, alkenyl, aryl, arylalkyl and alkylaryl groups optionally containing one or more hetero atoms, wherein at least one of $R_1$ and $R_2$ is not a hydrogen atom.

15. The method of claim 11, wherein the crystalline component comprises a compound of formula 6:

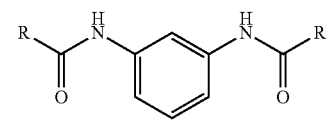

(6)

where R is selected from the group consisting of an alkyl group, alkenyl group, aryl group, arylalkyl group or alkylaryl group, the alkyl, alkenyl, aryl, arylalkyl and alkylaryl groups optionally containing one or more hetero atoms.

16. The method of claim 11, wherein the colorant is selected from the group consisting of a dye, a pigment or mixtures thereof.

17. The method of claim 11, wherein the crystalline and amorphous components are blended in a crystalline to amorphous component weight ratio ranging from about 60:40 to about 95:5.

18. A phase change ink composition, comprising:
a crystalline component comprising a diamide compound with an aromatic ring core;
an amorphous component; and
optionally a colorant,
wherein the crystalline component has a viscosity of less than 10 cps at a temperature of 140° C.; the amorphous component has a viscosity less than 100 cps at a temperature of about 140° C.; and the crystalline component has a viscosity of greater than $1\times10^6$ cps at room temperature; and the amorphous component has a viscosity of greater than $1\times10^5$ cps at room temperature.

19. The composition of claim 18, wherein the diamide compound is a compound of formula 1:

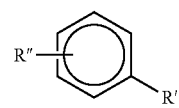

(1)

where R' and R" are independently selected from organic amide groups of formulae 2 or 3:

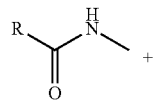

(2)

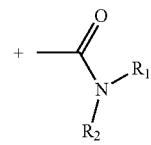

(3)

where R, $R_1$ and $R_2$ are independently selected from the group consisting of a hydrogen atom or a linear, branched or cyclic, saturated or unsaturated, aliphatic or aromatic $C_1$ to $C_{40}$ substituent group, wherein at least one of R, $R_1$ and $R_2$ is not a hydrogen atom.

20. The composition of claim 19, wherein:
R is selected from the group consisting of an alkyl group, alkenyl group, aryl group, arylalkyl group or alkylaryl group, the alkyl, alkenyl, aryl, arylalkyl and alkylaryl groups optionally containing one or more hetero atoms; and
$R_1$ and $R_2$ are independently selected from the group consisting of a hydrogen atom, alkyl group, alkenyl group, aryl group, arylalkyl group or alkylaryl group, the alkyl, alkenyl, aryl, arylalkyl and alkylaryl groups optionally containing one or more hetero atoms, wherein at least one of $R_1$ and $R_2$ is not a hydrogen atom.

* * * * *